May 30, 1950 R. M. SPRAGUE ET AL 2,509,789
TRANSMITTER FOR FREQUENCY-MODULATED RADIO COMMUNICATION SYSTEMS
Filed June 5, 1947
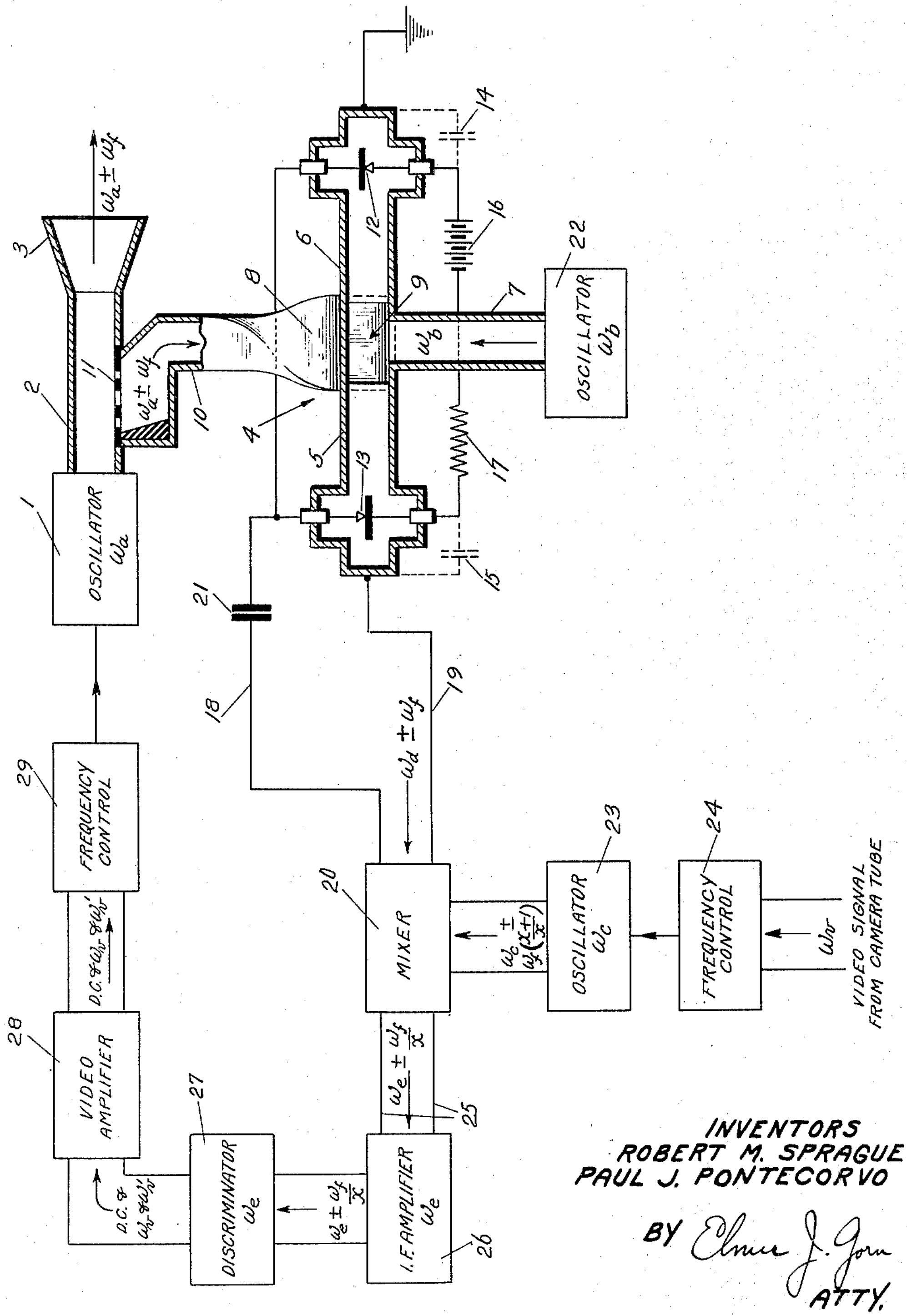
INVENTORS
ROBERT M. SPRAGUE
PAUL J. PONTECORVO
BY Elmer J. Gorn
ATTY.

Patented May 30, 1950 2,509,789

UNITED STATES PATENT OFFICE 2,509,789

TRANSMITTER FOR FREQUENCY-MODULATED RADIO COMMUNICATION SYSTEMS

Robert M. Sprague, Waban, and Paul J. Pontecorvo, Cambridge, Mass., assignors to Raytheon Manufacturing Company, Newton, Mass., a corporation of Delaware Application June 5, 1947, Serial No. 752,660

17 Claims. (Cl. 250—17)

This invention relates to radio communication systems, and more particularly to a transmitting station for a frequency-modulated microwave communication system for television or other types of signals.

In a system for transmitting television video signals, it is very important that the distortion of the signal by the transmitting equipment be held down to an absolute minimum, since otherwise the characteristics of the received picture may be adversely affected. Also, in multichannel communication equipment, the overall distortion must be held to a low value, in order to minimize cross-talk.

It is, therefore, an object of the present invention to provide a transmitting station of the foregoing general description which is so designed as to satisfy the above requirement of extremely low distortion.

In a system of the foregoing general description, it is necessary that the center frequency or the unmodulated carrier wave emanating from the transmitting station be frequency-stabilized within very close limits. This must be done in order to reduce distortion of the transmitted signal and also in order to eliminate possible nonreception of the transmitted signal by the receiving station due to a shift in the center or rest carrier frequency.

It is, therefore, another object of the present invention to devise a transmitting station the radiated carrier frequency of which is stabilized within very close limits.

A further object is to reduce the proportion of the noise produced, in various elements of a transmitting station, which is radiated into space from said station.

The foregoing and other objects of the invention will be best understood from the following description of an exemplification thereof, reference being had to the accompanying drawing, wherein the single figure is a partial block, partial schematic diagram of a transmitting station of the present invention.

Referring now to the drawing, the numeral 1 designates an oscillator, for example of the magnetron type, for locally generating, at the transmitting station, a carrier wave $\omega_a$, preferably in the microwave region of the electromagnetic spectrum. It is the rest frequency, unmodulated carrier frequency, mean frequency, or center frequency, of this carrier wave that it is desired to stabilize, by means incorporated in the station itself.

The oscillator 1 is adapted to be frequency-modulated in accordance with locally-generated intelligence, by means to be described hereinafter, the maximum frequency deviation of the carrier being represented by $\omega_f$. The energy output of the oscillator 1, consisting of the carrier wave $\omega_a$ and any intelligence $\omega_f$ impressed thereon, is applied to a waveguide 2, travelling therealong to an electromagnetic horn 3 adapted to directionally radiate said energy into space.

A waveguide assembly 4, known as a "magic T," is provided. Such a waveguide assembly comprises two oppositely-extending side branches 5 and 6, a so-called E arm 7 extending outwardly from said side branches 5 and 6, at right angles thereto, and a so-called H arm 8 extending outwardly from said side branches 5 and 6, mutually perpendicular to said side branches and said E arm, said side branches, said E arm, and said H arm all extending from a common junction 9. As shown in the drawing, the H arm 8 recedes from the observer for a short distance from the common junction 9, then bends upwardly, and is then twisted through an angle of 90°. The H arm 8 is connected, through a waveguide 10 and a unidirectional coupler 11, to the waveguide 2, whereby said arm is receptive only of energy coming directly from the oscillator 1, and cannot receive any reflected energy travelling from horn 3 toward said oscillator 1.

The side branches 5 and 6 are terminated in oppositely-disposed crystals 12 and 13, between one side of each of which and the "magic T" itself, capacitances 14 and 15 exist, said "magic T" being grounded, and said crystals being connected, in series with a source 16 of direct current and a resistor 17, to provide parallel outputs to one pair of input leads 18 and 19 of a mixer 20, through a capacitor 21. The source 16 of direct current is for the purpose of operating the crystals 12 and 13 at a favorable point along their characteristic curve, and the series circuit is for the purpose of passing equal currents through said crystals to assure their similar action even though they both be mismatched to the waveguide system.

Numeral 22 designates a very stable oscillator for locally generating a carrier wave $\omega_b$, preferably in the microwave region of the electromagnetic spectrum. This oscillator may be a Klystron, for example. Oscillator 22 is frequency-stabilized by any suitable means (not shown) at a frequency $\omega_b$. A suitable frequency-stabilizing means is shown in the copending application of George G. Bruck, Ser. No. 660,597, filed April 9, 1946, now Patent No. 2,468,029, issued April 26, 1949. $\omega_b$ normally differs from the frequency $\omega_a$ of oscillator 1 by a predetermined amount $\omega_d$, this frequency difference $\omega_d$ lying in the intermediate frequency range and being on the order of 100 megacycles, for example. In this example, frequency $\omega_a$ may be on the order of 4000 megacycles and frequency $\omega_b$ on the order of 4100 megacycles. The output of the oscillator 22, consisting of the frequency $\omega_b$, is applied to the E arm 7 of the "magic T" 4.

For an understanding of the operation of the "magic T" 4, assume that the electric vector of the wave $\omega_b$, travelling along the E arm 7, is pointing to the left, and further assume that the electric vector of the carrier wave $\omega_a$, travelling along the H arm 8, is pointing downwardly at the junction 9. When the former reaches the junction 9, it splits into two constituent waves, one, having its electric vector pointing upwardly, travelling toward the crystal 12, and the other, having its electric vector pointing downwardly, travelling toward the crystal 13. When the latter reaches the junction 9, it, too, splits into two constituent waves, one travelling toward the crystal 12 and the other travelling toward the crystal 13, with both having their electric vectors pointing in the same direction, namely, downwardly. Thus, there arrive at the crystal 12 two constituent waves which are out of phase, and there arrive at the crystal 13 two constituent waves which are in phase. Therefore, there is produced at the crystal 12, a beat-frequency wave whose frequency corresponds to the difference between the frequencies of the carrier waves, and whose phase may be considered negative because its component waves are out of phase; at the crystal 13, there is produced a beat-frequency wave having the same frequency as said first-named beat-frequency wave, and having a phase which may be considered positive because its component waves are in phase. However, as to each other, the two beat-frequency waves thus obtained are in phase, and set up equal voltages of like polarity across the crystals. Inasmuch as parallel outputs are taken from these crystals, addition occurs, and a constant-amplitude intermediate-frequency wave appears across the leads 18 and 19. This intermediate-frequency wave, normally and in the absence of any intelligence, has a predetermined frequency $\omega_d$, which as stated may have a value on the order of 100 megacycles.

The part of the system so far described may be termed the feed-back network, for reasons which will appear hereinafter, this network extending, in general, from the coupler 11 to the input leads 18 and 19 of the mixer 20. This network consists only of sections of waveguide, crystals, and wires, none of which will introduce into the signal fed back any frequency distortion whatever. The said network will introduce some amplitude distortion into the signal fed back, due to the attenuation of the signal in the waveguide sections, but this is immaterial since the intelligence is contained in frequency variations and not amplitude variations. The so-called factor $\beta$, which is the feed-back network attenuation, or ratio of the feedback voltage to the total output voltage, is equal to unity in this case, since with the above-described feedback network no gain or loss of frequency occurs in travelling through said network, and it is the frequency variations which transmit the desired intelligence.

Numeral 23 designates a very stable oscillator for generating a carrier wave $\omega_c$ of a substantially lower frequency than either $\omega_a$ or $\omega_b$. In the example given, $\omega_c$ may be on the order of 160 megacycles. The oscillator 23 is adapted to be frequency-modulated, by any preferred frequency control 24, in accordance with locally-generated intelligence $\omega_v$, for example a television video signal, which is applied to said frequency control from a camera tube, for example.

It has been found, according to this invention, that if the maximum frequency deviation of the original frequency-modulated signals from the low-frequency modulated oscillator is reduced, then applied through an intermediate-frequency amplifier to a discriminator, the voltage output of which is amplified and then used to frequency-modulate the microwave transmitter over the desired rather large maximum frequency deviation, as well as to control the center frequency of said transmitter, some of the objects of this invention may be accomplished. If the system is designed to function as described in this paragraph, advantages in addition to those which may result from the use of negative feedback, may be realized.

The maximum frequency deviation of the output of frequency-modulated oscillator 23, in response to intelligence, is designed to be $$\omega_f\left(\frac{x+1}{x}\right)$$

where $x$ is the so-called "loop gain" and $\omega_f$, as defined above, is the maximum frequency deviation of the main microwave oscillator 1. The frequency-modulated output of oscillator 23 is applied to the second input to mixer 20; it will be remembered that the output of the crystals, $\omega_d \pm \omega_f$, is applied to the other input to mixer 20. The mixer 20, which may be a pentagrid converter, for example, produces at its output, represented by leads 25, the difference of the two input frequencies, or a wave $$\omega_e \pm \frac{\omega_f}{x}$$

$\omega_e$ representing a rather low intermediate frequency and $$\frac{\omega_f}{x}$$

being the reduced maximum frequency deviation of the original frequency-modulated signals from the low-frequency modulated oscillator 23.

Continuing with a specific example, with $\omega_f$ of 5 megacycles and a loop gain $x$ of 10, $\omega_c$ being 160 megacycles, $$\omega_f\left(\frac{x+1}{x}\right)$$

would be 1.1×5, or 5.5 megacycles, so that the maximum frequency deviation of oscillator 23 would be ±5.5 megacycles. If $\omega_d$ is 100 megacycles, $\omega_e$ would be 60 megacycles ($\omega_c - \omega_d$), and $$\frac{\omega_f}{x}$$

would be $\frac{5}{10}$, or 0.5 megacycle, which is also 5.5 minus 5, or the maximum frequency deviation of oscillator 23 minus the maximum frequency deviation of oscillator 1.

The output of mixer 20 is applied to a narrow-band intermediate-frequency amplifier 26 whose center frequency corresponds to $\omega_e$, which is the normal difference between the intermediate-frequency $\omega_d$ and $\omega_c$. The output of the amplifier 26, consisting of the difference frequency $\omega_e$ and the reduced maximum frequency deviation $$\frac{\omega_f}{x}$$

resulting from any intelligence $\omega_v$, is applied to a frequency discriminator 27 whose center frequency or resonant frequency corresponds to the normal difference frequency $\omega_e$, in the example given 60 megacycles. The instantaneous output voltage of the discriminator is proportional to the instantaneous value of modulation-frequency voltage used to modulate the carrier wave of oscillator 23, so that the frequency-modulated input voltage $$\omega_e \pm \frac{\omega_f}{x}$$

is converted into the modulation-frequency output voltage $\omega_v$.

The voltage output $\omega_v$ of the discriminator 27 is amplified in a video amplifier 28, and this voltage is used to frequency-modulate microwave oscillator 1, or to cause corresponding frequency deviations thereof, by means of any preferred frequency control 29. The frequency-modulated microwave signal $\omega_a \pm \omega_f$, containing the desired intelligence, is then radiated into space by means of horn 3, as heretofore explained. The voltage output of the discriminator 27, when amplified by amplifier 29, is sufficient to cause the desired rather large maximum frequency deviation $\omega_f$ of the microwave transmitter 1.

The quantity $x$, the loop gain, as used herein, is intended to mean the ratio of the highest maximum frequency deviation to the lowest maximum frequency deviation around the loop consisting of waveguide assembly 4, mixer 20, amplifier 26, discriminator 27, amplifier 28, frequency control 29, and oscillator 1. Such frequency deviation is, of course, due to the frequency-modulation of the carrier by the intelligence $\omega_v$ being transmitted. When the loop gain $x$ has been decided upon, along with the maximum frequency deviation of the main microwave transmitter 1, the maximum frequency deviation of oscillator 23 is determined, since said latter frequency deviation depends upon $\omega_f$ and $x$.

The maximum frequency deviation of the signal passing through the amplifier 26 and the discriminator 27 is only $\omega_f/x$, or the transmitted maximum frequency deviation divided by the loop gain, which may be on the order of 10, for example. Therefore, amplifier 26 and discriminator 27 do not need to be designed to have a linear response over a broad band equal to the maximum frequency deviation $\omega_f$, but only over a narrow band $$\frac{\omega_f}{x}$$

on the order of 0.5 megacycle, for example. Thus, the problems of design of elements 26 and 27 are greatly simplified as compared to what such problems would be if said elements had to respond linearly over a band on the order of $\omega_f$.

As long as the mean frequency of the intermediate-frequency wave, derived from the mixing (in mixer 20) or heterodyning of the wave $\omega_d$ and the wave $\omega_c$, corresponds to the predetermined difference $\omega_e$ therebetween, the only output from the discriminator 27 is a video-frequency output corresponding to the intelligence $\omega_v$. Any slow drift from this frequency $\omega_e$ is due to drift of oscillator 1, since frequencies $\omega_c$ and $\omega_b$ are substantially constant due to the extreme stability of oscillators 23 and 22. Should the oscillator 1 drift, resulting in a deviation of the center or rest frequency of the intermediate-frequency wave from the said predetermined difference $\omega_e$, the discriminator 27 will have an output including, in addition to that resulting from the intelligence applied thereto, a direct current or unidirectional component whose sense and magnitude will depend, respectively, on the sense and magnitude of any such deviation. This direct current component is applied, through amplifier 28, to the frequency control 29 to adjust the oscillator 1 and compensate for any frequency deviation from the minimum or rest frequency desired of said oscillator. In this connection, it is desired to bring out another advantage of this invention, due to the fact that a feedback loop is provided having a loop gain $x$ substantially greater than 1. A loop gain $x$ greater than 1 reduces the drift of oscillator 1 by the same factor $x$. For example, assume that oscillator 1 drifts 20 megacycles from its normal mean frequency of 4,000 megacycles, that oscillator 22 has a frequency of 4,100 megacycles, and oscillator 23 a frequency of 160 megacycles. If $\omega_a$ is 4,020 and $\omega_b$ is 4,100, $\omega_d$, their difference, will be 80 megacycles, and $\omega_e$ (the difference between $\omega_d$ and $\omega_c$) will be 80 megacycles. This will produce, in the output of discriminator 27, a voltage corresponding to a frequency deviation of 20 megacycles, since said discriminator is centered on 60 megacycles and an 80 megacycles signal is passing therethrough. But discriminator 27 and amplifier 28 together are designed to produce a voltage sufficient to cause a frequency deviation $x$ times that at the input of the discriminator, so that the drift of oscillator 1 is reduced by the factor $x$; therefore, in the example given, the 20 megacycles drift would be reduced to 2 megacycles if $x$ is 10. This 2 megacycles drift is a small percentage of the occupied band of 10 megacycles.

The feedback network itself, which consists of the elements between coupler 11 and the input 18, 19 to mixer 20 (that is, waveguide assembly 4, crystals 12 and 13, and the lead wires therefrom), the so-called $\beta$ network, is designed to be negative, inverse, or degenerative, decreasing the gain of the overall system. The so-called "feedback amplifier" would then consist of elements 20, 26, 27, 28, 29, and 1. If, in accordance with conventional practice, we let $\mu'$ represent the amplification of this "amplifier" without feedback, the product $\mu'\beta$ is the feedback factor, $\beta$ being defined above. In this invention, the said feedback factor is designed to be much greater than 1. It is known (see, for example, page 223 of Theory and Application of Electron Tubes, by H. J. Reich, published by McGraw-Hill Book Company, New York city, 1939) that if $\mu'\beta$ is much greater than 1, the gain is inversely proportional to $\beta$, which is the feedback network attenuation. The value $1/\beta$ is independent of $\mu'$, which means that frequency distortion (which will be called merely distortion hereinafter, since the intelligence in the system of this invention depends upon the instantaneous frequency of the signal) which might be introduced by the "feedback amplifier" of this invention is reduced by negative feedback.

Assume that a certain type of frequency distortion tends to appear in the output of oscillator 1. This same type of distortion will appear in the input leads 18 and 19 to mixer 20, because of the feedback from waveguide 2 and the absence of frequency distortion in the feedback network itself. This distorted wave, being mixed in mixer 20 with the output of oscillator 23, which is relatively free from distortion, results in an output wave from mixer 20 which has a rather large (due to the reduction in frequency which takes place, in effect, in mixer 20) amount of frequency distortion. Due to the aforesaid mixing and the effective subtraction of the two waves in mixer 20, this distortion is inverse to that of oscillator 1, and it may therefore be termed a "counter-distortion component." The resultant wave appearing in the output of mixer 20 therefore has a large counter-distortion component.

The feedback network itself, consisting as it does only of waveguide sections, crystals, and wires, will introduce into the signal fed back no frequency distortion whatever, so that the $\beta$-factor of the feedback network according to this invention is independent of frequency. Therefore, since no distortion is introduced into the signal by the $\beta$ circuit or feedback network, and since the negative feedback action itself reduces distortion, it may be seen that the overall distortion is reduced very markedly. In fact, with a loop gain $x$ of 10 to 1, the negative feedback action of this system reduces the distortion of the signal transmitted from oscillator 1 to a value on the order of 0.1 of what it would be without such feedback.

The wave $\omega'_v$, indicated as appearing in the output of discriminator 27 and video amplifier 28, is the distortion component of the video signal which is fed back by means of the feedback network.

The use of negative feedback as in the system of this invention also reduces noise produced by the oscillator 1. When the quantity $1-\mu'\beta$ is greater than 1, the factor, by which the noise-to-signal ratio is changed in passing through the system, is always less than unity. Therefore, and since in the feedback network of this invention $1-\mu'\beta$ is greater than 1, the noise-to-signal ratio is decreased in passing from input to output of the system. In other words, noise produced by or in oscillatior 1 is reduced by the system of this invention. In fact, the noise is reduced by the loop gain factor $x$.

It should be made clear, at this point, that the feedback amplifying system 20, 26, 27, 28 is designed so that the phase shift of the feedback voltage, relative to its phase at the middle of the band, at no time reaches 180°, or if it does reach 180°, so that the absolute value of $\mu'\beta$ falls below unity before the 180° phase shift is reached. For this purpose, the number of stages in the video amplifier 28 may be reduced, or the required relations may be effectuated in other suitable ways. Under these conditions, oscillations will not occur in the feedback amplifying system, so that the entire transmitting system is stable.

Of course, it is to be understood that this invention is not limited to the particular details as described above, as many equivalents will suggest themselves to those skilled in the art. Although a video signal, which may vary for example from 30 cycles to 6 megacycles, is shown as the intelligence which is used to frequency-modulate the carrier wave of oscillator 1, instead, other types of signals may be fed into frequency control 24; for example, a 2 megacycles subcarrier which is frequency-modulated by a plurality of signals, by means of a frequency-division multiplex system, may be used to frequency-modulate oscillator 23. Various other variations will suggest themselves. It is accordingly desired that the appended claims be given a broad interpretation commensurate with the scope of this invention within the art.

What is claimed is:

1. In a transmitting station for a frequency-modulated communication system: means for generating a first carrier wave; means for frequency-modulating said wave with intelligence to be transmitted; a frequency-modulated oscillator for generating and transmitting into space a second carrier wave; means for abstracting a portion of said second wave; means for mixing said abstracted portion with said first frequency-modulated wave to produce a resultant wave having a maximum frequency deviation small in comparison to the maximum frequency deviations of each of said carrier waves; and means for frequency-modulating said oscillator with the intelligence contained in said resultant wave.

2. In a transmitting station for a frequency-modulated communication system: means for generating a first carrier wave; means for frequency-modulating said wave with intelligence to be transmitted; a frequency-modulated oscillator for generating and transmitting into space a second carrier wave; means for degeneratively feeding back a portion of said second wave into said first frequency-modulated wave in order to produce therefrom a resultant wave having a large counter-distortion component; and means for frequency-modulating said oscillator with the intelligence contained in said resultant wave.

3. In a transmitting station for a frequency-modulated communication system: means for generating a first carrier wave; means for frequency-modulating said wave with intelligence to be transmitted; a frequency-modulated oscillator for generating and transmitting into space a second carrier wave; a feedback network for degeneratively feeding back a portion of said second wave into said first frequency-modulated wave in order to produce therefrom a resultant wave having a large counter-distortion frequency component; said network having an attenuation independent of frequency; and means for frequency-modulating said oscillator with the intelligence contained in said resultant wave.

4. In a transmitting station for a frequency-modulated communication system: means for generating a first carrier wave; means for generating and transmitting into space a second carrier wave; means for abstracting a portion of said second wave and for deriving therefrom an intermediate-frequency wave normally having a predetermined frequency; said first wave and said intermediate-frequency wave normally having a predetermined frequency difference therebetween; means for mixing said first wave and said intermediate-frequency wave to produce a second intermediate-frequency wave whose frequency normally corresponds to said predetermined frequency difference; means, receptive of said second intermediate-frequency wave, for deriving therefrom a unidirectional output whose sense and magnitude are functions, respectively, of the sense and magnitude of any deviation of the frequency of said second intermediate-frequency wave from said predetermined frequency difference; and means, receptive of said unidirectional output, for so controlling the frequency of said second wave as to maintain substantially constant said predetermined frequency.

5. In a transmitting station for a frequency-modulated communication system: means for generating a first carrier wave; means for frequency-modulating said wave with intelligence to be transmitted; a frequency-modulated oscillator for generating and transmitting into space a second carrier wave; the maximum frequency deviations of said two waves having a predetermined difference therebetween which is small in comparison to the maximum frequency deviations of each of said waves; means for generating a third carrier wave; means, receptive of said third wave and a portion of said second wave, for deriving therefrom an intermediate-frequency wave whose maximum frequency deviation corresponds to that of said second wave; means for mixing said intermediate-frequency wave with said first frequency-modulated wave to produce a resultant wave having said small predetermined maximum frequency deviation; and means for frequency-modulating said oscillator with the intelligence contained in said resultant wave.

6. In a transmitting station for a frequency-modulated communication system: means for generating a first carrier wave; means for frequency-modulating said wave with intelligence to be transmitted; a frequency-modulated oscillator for generating and transmitting into space a second carrier wave; the maximum frequency deviations of said two waves having a predetermined difference therebetween which is small in comparison to the maximum frequency deviations of each of said waves; means for generating a third carrier wave; means, receptive of said third wave and a portion of said second wave, for deriving therefrom an intermediate-frequency wave whose maximum frequency deviation corresponds to that of said second wave; means for mixing said intermediate-frequency wave with said first frequency-modulated wave to produce a resultant wave having said small predetermined maximum frequency deviation; and means for frequency-modulating said oscillator with the intelligence contained in said resultant wave; said last-named means including amplifying means for deriving from said resultant wave a signal capable of producing a large maximum frequency deviation of said second wave.

7. In a transmitting station for a frequency-modulated communication system: means for generating a first carrier wave; a frequency-modulated oscillator for generating and transmitting into space a second carrier wave; said second wave having a predetermined maximum frequency deviation; a feedback loop for feeding back a portion of said second wave into the input of said oscillator; means for frequency-modulating said first wave with intelligence to be transmitted; the maximum frequency deviation of said first wave being equal to said predetermined deviation multiplied by the factor $$\frac{x+1}{x}$$

where $x$ is the gain of said loop; means for mixing the fedback portion of said second wave with said first frequency-modulated wave to produce a resultant wave having a maximum frequency deviation equal to said predetermined deviation multiplied by the factor $$\frac{1}{x}$$

and means for frequency-modulating said oscillator with the intelligence contained in said resultant wave.

8. In a transmitting station for a frequency-modulated communication system: means for generating a first carrier wave; a frequency-modulated oscillator for generating and transmitting into space a second carrier wave; said second wave having a predetermined maximum frequency deviation; a feedback loop for feeding back a portion of said second wave into the input of said oscillator; means for frequency-modulating said first wave with intelligence to be transmitted; the maximum frequency deviation of said first wave being equal to said predetermined frequency deviation multiplied by the factor $$\frac{x+1}{x}$$

where $x$ is the gain of said loop; means for mixing the fedback portion of said second wave with said first frequency-modulated wave to produce a resultant wave having a maximum frequency deviation equal to said predetermined frequency deviation multiplied by the factor $$\frac{1}{x}$$

and means for frequency-modulating said oscillator with the intelligence contained in said resultant wave; said last-named means including amplifying means for deriving from said resultant wave a signal capable of producing said predetermined frequency deviation of said second wave.

9. In a transmitting station for a frequency-modulated communication system: means for generating a first carrier wave; means for generating and transmitting into space a second carrier wave; means for generating a third carrier wave said second and third waves normally having a predetermined frequency difference therebetween; means, receptive of said third wave and a portion of said second wave, for deriving therefrom an intermediate-frequency wave whose frequency normally corresponds to said predetermined frequency difference; said first wave and said intermediate-frequency wave normally having a predetermined frequency difference therebetween; means for mixing said first wave and said intermediate-frequency wave to produce a second intermediate-frequency wave whose frequency normally corresponds to said predetermined difference between the frequencies of said first wave and said first intermediate-frequency wave; means, receptive of said second intermediate-frequency wave, for deriving therefrom a unidirectional output whose sense and magnitude are functions, respectively, of the sense and magnitude of any deviation of the frequency of said second intermediate-frequency wave from said predetermined difference between the frequencies of said first wave and said first intermediate-frequency wave; and means, receptive of said unidirectional output, for so controlling the frequency of said second wave as to maintain substantially constant said predetermined difference between the frequencies of said second and third waves.

10. In a transmitting station for a frequency-modulated communication system: means for generating a first carrier wave; means for frequency-modulating said wave with intelligence to be transmitted; a frequency-modulated oscillator for generating and transmitting into space a second carrier wave; means for abstracting a portion of said second wave and for deriving therefrom an intermediate-frequency wave; means for degeneratively feeding back said intermediate-frequency wave into said first frequency-modulated wave in order to produce therefrom a resultant wave having a large counter-distortion component; and means for frequency-modulating said oscillator with the intelligence contained in said resultant wave.

11. In a transmitting station for a frequency-modulated communication system: means for generating a first carrier wave; means for frequency-modulating said wave with intelligence to be transmitted; a frequency-modulated oscillator for generating and transmitting into space a second carrier wave; means for generating a third carrier wave; means, receptive of said third wave and a portion of said second wave, for deriving therefrom an intermediate-frequency wave; means for degeneratively feeding back said intermediate-frequency wave into said first frequency-modulated wave in order to produce therefrom a resultant wave having a large counter-distortion component; and means for frequency-modulating said oscillator with the intelligence contained in said resultant wave.

12. In a transmitting station for a frequency-modulated communication system: means for generating a first carrier wave; means for frequency-modulating said wave with intelligence to be transmitted; a frequency-modulated oscillator for generating and transmitting into space a second carrier wave; the maximum frequency deviations of said two waves having a predetermined difference therebetween which is small in comparison to the maximum frequency deviations of each of said waves; means for degeneratively feeding back a portion of said second wave into said first frequency-modulated wave to produce a resultant wave having said small predetermined maximum frequency deviation and having a large counter-distortion component; and means for frequency-modulating said oscillator with the intelligence contained in said resultant wave.

13. In a transmitting station for a frequency-modulated communication system: means for generating a first carrier wave; means for frequency-modulating said wave with intelligence to be transmitted; a frequency-modulated oscillator for generating and transmitting into space a second carrier wave; the maximum frequency deviations of said two waves having a predetermined difference therebetween which is small in comparison to the maximum frequency deviations of each of said waves; means for degeneratively feeding back a portion of said second wave into said first frequency-modulated wave to produce a resultant wave having said small predetermined maximum frequency deviation and having a large counter-distortion component; and means for frequency-modulating said oscillator with the intelligence contained in said resultant wave; said last-named means including amplifying means for deriving from said resultant wave a signal capable of producing a large maximum frequency deviation of said second wave.

14. In a transmitting station for a frequency-modulated communication system: means for generating a first carrier wave; means for frequency-modulating said wave with intelligence to be transmitted; a frequency-modulated oscillator for generating and transmitting into space a second carrier wave; the maximum frequency deviations of said two waves having a predetermined difference therebetween which is small in comparison to the maximum frequecy deviations of each of said waves; means for abstracting a portion of said second wave and for deriving therefrom an intermediate-frequency wave; means for degeneratively feeding back said intermediate-frequency wave into said first frequency-modulated wave to produce a resultant wave having said small predetermined maximum frequency deviation and having a large counter-distortion component; and means for frequency-modulating said oscillator with the intelligence contained in said resultant wave.

15. In a transmitting station for a frequency-modulated communication system: means for generating a first carrier wave; means for frequency-modulating said wave with intelligence to be transmitted; a frequency-modulated oscillator for generating and transmitting into space a second carrier wave; a feedback network for abstracting a portion of said second wave and for deriving therefrom an intermediate-frequency wave, said network including means for degeneratively feeding back said intermediate-frequency wave into said first frequency-modulated wave in order to produce therefrom a resultant wave having a large counter-distortion frequency component; said network having an attenuation independent of frequency; and means for frequency-modulating said oscillator with the intelligence contained in said resultant wave.

16. In a transmitting station for a frequency-modulated communication system: means for generating a first carrier wave; means for frequency-modulating said wave with intelligence to be transmited; a frequency-modulated oscillator for generating and transmitting into space a second carrier wave, the maximum frequency deviations of said two waves having a predetermined difference therebetween which is small in comparison to the maximum frequency deviations of each of said waves; a feedback network for degeneratively feeding back a portion of said second wave into said first frequency-modulated wave to produce a resultant wave having said small predetermined maximum frequency deviation and having a large counter-distortion frequency component; said nework having an attenuation independent of frequency; and means for frequency-modulating said oscillator with the intelligence contained in said resultant wave.

17. In a transmitting station for a frequency-modulated communication system: means for generating a first carrier wave; means for frequency-modulating said wave with intelligence to be transmitted; a frequency-modulated oscillator for generating and transmitting into space a second carrier wave; the maximum frequency deviations of said two waves having a predetermined difference therebetween which is small in comparison to the maximum frequency deviations of each of said waves; a feedback network for abstracting a portion of said second wave and for deriving therefrom an intermediate-frequency wave, said network including means for degeneratively feeding back said intermediate-frequency wave into said first frequency-modulated wave to produce a resultant wave having said small predetermined maximum frequency deviation and having a large counter-distortion frequency component; said network having an attenuation independent of frequency; and means for frequency-modulating said oscillator with the intelligence contained in said resultant wave.

ROBERT M. SPRAGUE.
PAUL J. PONTECORVO.

REFERENCES CITED

The following references are of record in the file of this patent:

UNITED STATES PATENTS

| Number | Name | Date |
|---|---|---|
| 2,296,919 | Goldstine | Sept. 29, 1942 |
| 2,377,326 | Crosby | June 5, 1945 |
| 2,425,657 | Tunick | Aug. 12, 1947 |